INVENTOR:
GEORGE A. GODWIN
BY
Mason, Kolehmainen, Rathburn & Wyss
ATT'YS

Aug. 8, 1967 G. A. GODWIN 3,335,235

MULTIPLE SPEED TIMING DEVICE WITH IMPROVED DRIVE

Filed March 2, 1965

8 Sheets-Sheet 2

INVENTOR:
GEORGE A. GODWIN
BY
Mason, Kolehmainen, Rathburn & Wyss,
ATT'YS

INVENTOR:
GEORGE A. GODWIN
BY
Mason, Kolehmainen, Rathburn & Wyss
ATT'YS

MULTIPLE SPEED TIMING DEVICE WITH IMPROVED DRIVE

Filed March 2, 1965

INVENTOR:
GEORGE A. GODWIN
BY
Mason, Kolehmainen, Rathburn & Wyss
ATT'YS

INVENTOR:
GEORGE A. GODWIN
BY
Mason, Kolehmainen, Rathburn & Wyss
ATT'YS

Aug. 8, 1967 G. A. GODWIN 3,335,235

MULTIPLE SPEED TIMING DEVICE WITH IMPROVED DRIVE

Filed March 2, 1965

8 Sheets-Sheet 6

INVENTOR:
GEORGE A. GODWIN
BY
*Mason, Kolehmainen, Rathburn & Wyss*
ATT'YS

Aug. 8, 1967 G. A. GODWIN 3,335,235

MULTIPLE SPEED TIMING DEVICE WITH IMPROVED DRIVE

Filed March 2, 1965

8 Sheets-Sheet 7

*INVENTOR:*
GEORGE A. GODWIN
*BY*
Mason, Kolehmainen, Rathburn & Wyss
ATT'YS

INVENTOR:
GEORGE A. GODWIN
BY
Mason, Kolehmainen, Rathburn & Wyss
ATT'YS

United States Patent Office 3,335,235
Patented Aug. 8, 1967

3,335,235
MULTIPLE SPEED TIMING DEVICE WITH IMPROVED DRIVE

George Alfred Godwin, Carmel, Ind., assignor, by mesne assignments, to Small Business Administration, Indianapolis, Ind.

Filed Mar. 2, 1965, Ser. No. 436,423
14 Claims. (Cl. 200—38)

The present invention relates to timing devices and, more particularly, to timing devices of the type suitable for controlling the cycling of appliances and the like.

Timing devices of the type wherein a plurality of cam operated switches control an appliance are well known. Such timing devices generally employ an electric drive motor to advance a cam controlling electrical switches. Many commercial embodiments are available where the cams are driven by an escapement mechanism to move in steps or jumps. It is desirable in a timing device which controls the cycling of operation of an appliance to insure its highly reliable operation through the entire life of the appliance.

Advantageously the timing device according to the present invention employs a constant speed direct drive of the cams and cam shaft. Advantageously the constant speed drive provides for simplicity of mechanism, elimination of a number of components subject to failure, greater usable excess output torque, thus enabling the appliance manufacturer to incorporate shaft driven features in his appliance, greater freedom in choosing the time elements for the appliance functions since the entire 360° cam surface may be allocated to this purpose rather than a practical maximum of sixty time increments, less noise in operation since the sound of the tripping of the escapement is not present, elimination of the problem of precise orientation of cam lobes and cam followers, and performance of appliance functions in a desired sequence. Snap action of the switches is not required to handle low current circuits but snap action may be employed to service higher current requirements such as the main motor circuit. Advantageously the timing device according to the present invention has excellent repeat accuracy and allows unlimited choice of cycle times for performance of the appliance functions.

Accordingly it is an object of the present invention to provide a new and improved timing device.

Another object of the present invention is to provide a timing device having a new and improved housing.

Yet another object of the present invention is to provide a timing device having a new and improved cam shaft.

A further object of the present invention is to provide an improved timing device having new and improved direct driven cams.

A further object of the present invention is to provide an improved timing device having new and improved cam followers.

A further object of the present invention is to provide an improved timing device having new and improved ratchet means to provide for advancing the cams and cam shaft manually.

Yet a further object of the present invention is to provide an improved ratchet lock which prevents manual advance of the cam shaft and cams when the main switch is in one of its positions.

Yet a further object of the present invention is to provide an improved timing device which is of comparatively narrow depth to fit in areas where side-to-side space is limited, as in some dishwasher designs.

Yet a further object of the present invention is to provide an improved timing device which selectively may be set to one of two cycling speeds.

Yet a further object of the present invention is the provision of an improved timing device which will advance the cam shaft rapidly if it is desired to eliminate all or a portion of a normal timer switch function.

Yet a further object of the present invention is to provide a new and improved housing assembly for a timing device.

Yet a further object of the present invention is the provision of a new and improved line or main switch in a timing device.

Further objects and advantages of the present invention will become apparent as the following description proceeds and the features of novelty which characterize the invention will be pointed out with particularity in the claims annexed and forming a part of this specification.

In accordance with these and other objects, there is provided an improved timing device of the type which may be used to control the cycling of an electrical appliance and including an improved housing having terminal board assemblies forming one pair of side plates, and flexible bowed side plates between the terminal board assemblies. Cam shaft means are rotatably supported within the housing and includes an outer sleeve and an inner shaft rotatable as a unit and mounted for limited relative axial movement. A control knob on the inner shaft permits the inner shaft to be moved in and out to control the line or main switch of the appliance. The outer sleeve carries a plurality of spaced disc cams and a plurality of improved cam followers are selectively associated with the cams. A gear train interconnects an electrical drive motor and the cam shaft and includes ratchet means which is effective to permit manual advance of the cam shaft means in one direction only.

According to a specific additional feature of the invention, lock means may be provided which renders the ratchet means effective or ineffective in response to the axial position of the inner shaft, that is, in response to the on or off condition of the line or main switch.

According to another embodiment of the present invention, the timing device may have parallel tandem cam shafts to provide a timing device of shallow depth. Such a tandem timing device need have only one of its cam shafts provided with the outer sleeve and inner shaft to control the line or main switch of the device.

According to yet another feature of the present invention, the timing device may be provided with a two speed gear train arrangement so that the customer may selectively choose either of the two speeds using a shift lever arrangement provided on the timer switch.

According to yet another feature of the present invention, the timer device may be provided with a fast advance arrangement. In the illustrated embodiment the fast advance timer employs two motors, each connected to a gear train and driving the cam shaft at different speeds. The gear trains each include suitable ratchet means so that the faster operating motor will override the slower operating motor. The motors are selectively operated to provide the desired rapid advance of the cam shaft when it is desired to eliminate all or a portion of a normal timer switch function.

Advantageously the improved timer device drives the cam shaft directly from the drive motor thus eliminating the difficulties encountered in escapements which move the cam shaft in steps or jumps. Advantageously the improved housing employs terminal boards which may be molded of a phenolic composition and which may be provided with stiff vertical ribs and serve the dual purpose of supporting the switch elements and providing great rigidity to the board. Thus many cams may be used and many more circuits handled without undue distortion and consequent loss of contact spacing or pressure. Advantageously the bowed flexible side plates provide a tight, rattleproof housing assembly. The cam shaft design employing the inner shaft and outer sleeve permits the operating cams to remain axially fixed and eliminates the possibility of one or more cam edges "catching" or "hanging up" on a cam spring and causing distortion and possible switch failure. The inner shaft rotates with the outer sleeve or cam carrying sleeve but is free to move axially to operate the line switch cam. A detent spring, functioning through a slot in the outer shaft, fixes the axial position of the inner shaft. The drive gear and all operating cams are pressed over a large non-circular outer shaft and secured by a self locking nut. The relatively large size of the outer shaft permits close orientation of the operating cams. The inner shaft may be arranged to extend through the bottom plate to permit incorporation of a kickout device for stopping the appliance. The line switch is operated by axial movement of the inner shaft and can be either a pull close or a push close type. In either case the switch elements are similar or are identical and are mounted on the same location on the switch. Moreover in either type the flat end cam which operates the line switch is entirely free of any contact with the switch spring when the timer is in operation. This can be furnished in either index out or index in arrangements. The cam follower is designed to shift laterally at the instant the follower drops to a lower cam level. This feature minimizes forced advance of the cam shaft with its associated wear and tear on the drive system and motor. Additionally since the followers move both pivotally and sideways, application of turning moment on the cams is prevented. The ratchet means permit manual advance of the cam shaft in one direction while preventing manual rotation of the cam shaft in the reverse direction. Moreover, according to another feature of the invention, a ratchet lock may readily be incorporated into the timer to prevent manual advance of the cam shaft while the line switch is in an operative position.

For a better understanding of the present invention, reference may be had to the accompanying drawings wherein.

Figures 1, 2, 3:
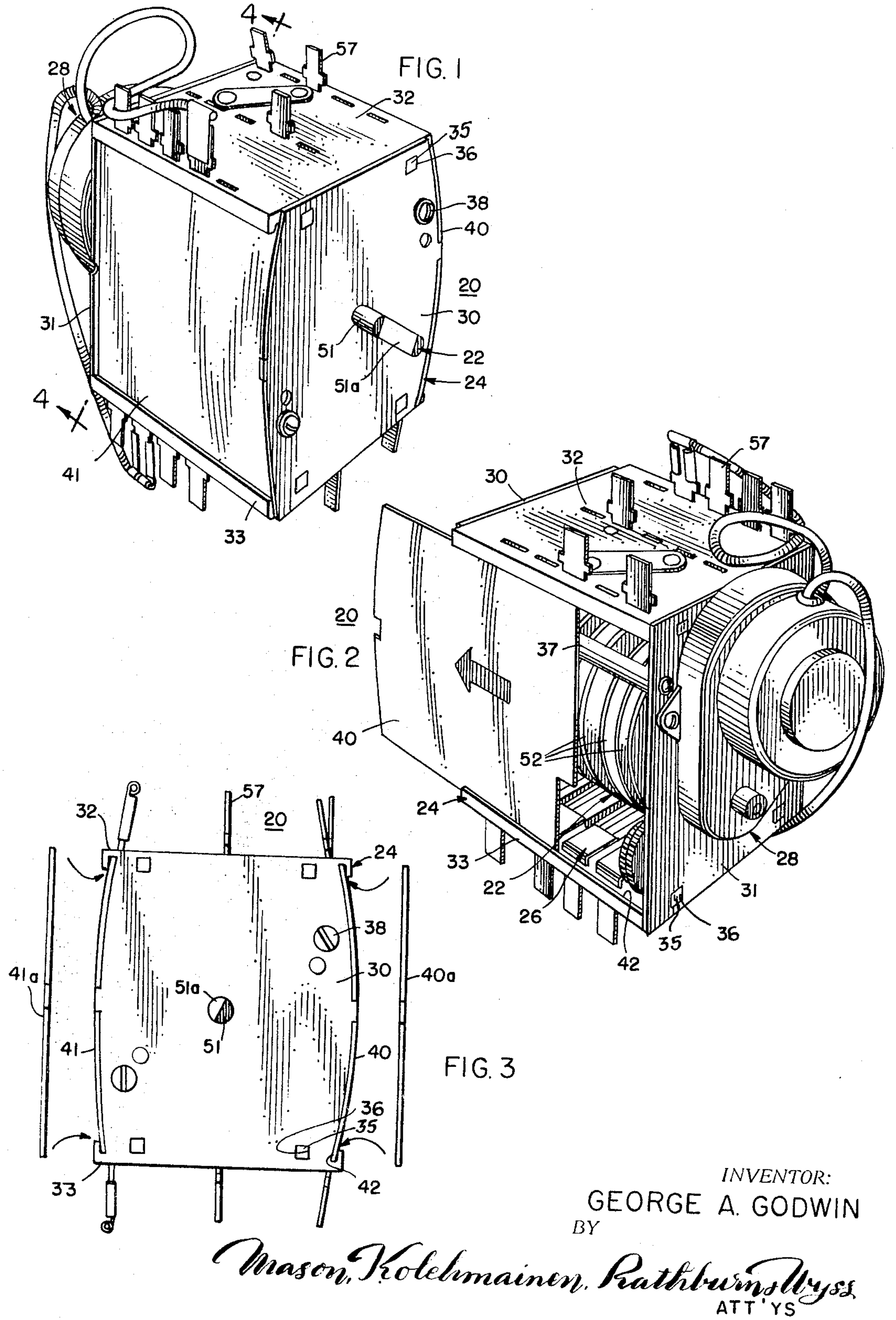
FIGURE 1 is an isometric front view of a timing device according to the present invention.
FIGURE 2 is an isometric rear view of the timing device of FIGURE 1, with a side of the housing partially removed.
FIGURE 3 is a front elevational view of the timing device of FIGURE 1, shown somewhat schematically, and illustrating the insertion of the flexible side plates with the remainder of the housing.

Referring now to the drawings, and particularly to the embodiment of FIGURES 1 through 13, there is illustrated a new and improved timing device 20 according to the present invention. The timing device 20 includes a cam and cam shaft assembly 22 rotatably supported within a housing 24 and arranged to selectively actuate a plurality of control switch members 26 in the form of electrical switches. The timing device 20 additionally includes one or more drive motors 28 to drive the cam and cam shaft assembly 22 during the cycling of the timer.

Referring first to the housing 24, the housing 24 is formed of a pair of spaced rigid metal end plates 30, 31 rotatably supporting the cam and cam shaft assembly 22. The end plates 30 and 31 are held in spaced apart relation by spaced rigid side plates or terminal boards 32, 33 of suitable insulating material such as molded phenolic composition. The terminal boards 32, 33 are each provided with stiff vertical ribs 34 which serve the dual purpose of supporting switch elements and of providing great rigidity to the terminal boards. End projections 35, FIGURES 1, 2, 3 and 10, formed on each end of the ribs 34, extend through openings 36 in the end plates 30, 31 to position the terminal boards 32, 33 with reference to the end plates. The end plates are held assembled with the terminal boards by suitable spacer sleeves 37 and screws 38.

To provide access means into the housing, and to facilitate closing of the housing, the housing 24 is completed by a pair of thin flexible side plates 40 and 41 supported in respective pairs of opposed grooves 42 formed along the edges of the terminal boards 32, 33 in the confronting surfaces thereof. As best illustrated in FIGURE 3, the side plates 40 and 41 are received within the grooves and held in a bowed position by the edges of the end plate 30. The side plates 40 and 41 are effective to maintain the components of the timing device 20 in firm, rattleproof relation. The side plates 40 and 41 may be formed of any suitable material such as fiber. It will be understood that the side plates 40 and 41 may be assembled in the timing device either by initially providing a slight bow to the side plates and then sliding them in from one end to the timing device, as best illustrated in FIGURE 2, or by taking the unbowed plate **40*a*, 41*a*, FIGURE 3, providing an initial bow to the plates 40 and 41, and thereafter permitting the plate to snap into place between the grooves 42**.

Referring now to the cam and cam shaft assembly 22, the assembly 22 is rotatably supported between the end plates 30 and 31 of the timer housing 24. The cam shaft includes an outer sleeve 50 and an inner shaft 51 axially movable within the outer sleeve 50. The outer sleeve 50 is preferably of non-circular cross section to provide accurate alignment with the cams. In the illustrated embodiment, the cam shaft is illustrated as hexagonal, but it may be of other suitable cross section such as D or double D. One end 51*a* of the inner shaft extends through the end plate 30 and is adapted to receive a suitable control knob (not shown). The outer sleeve carries a plurality of spaced disc cams 52 for actuating the control switch members 26.

Figures 4, 5:
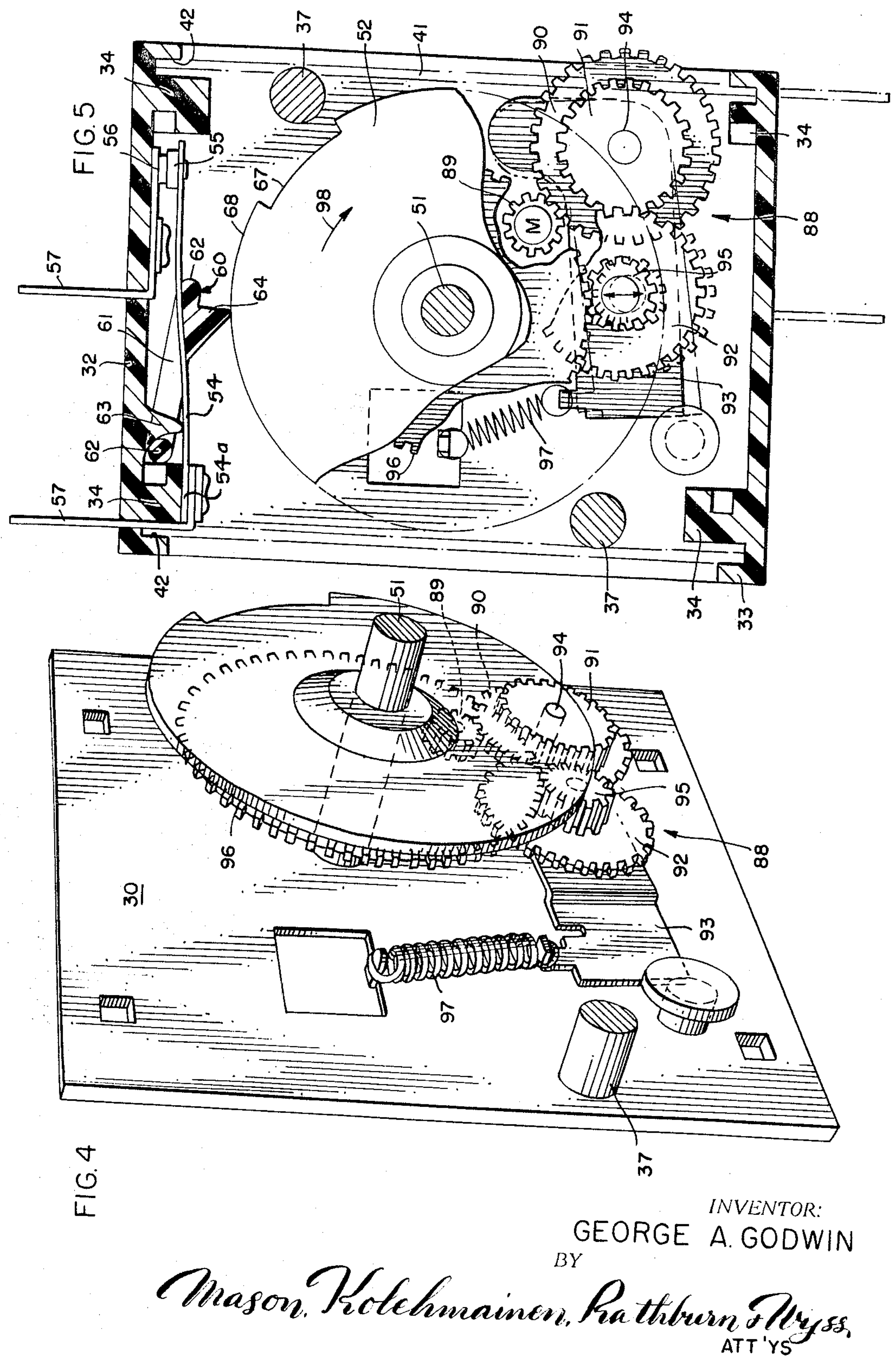
FIGURE 4 is an isometric, cross sectional view of the timing device of FIGURE 1, taken along lines 4—4 of FIGURE 1, and illustrating the driver gear train and ratchet mechanism for permitting forward manual advance of the cam shaft.
FIGURE 5 is a front sectional view of the ratcheting mechanism of FIGURE 4.
Figure 6:
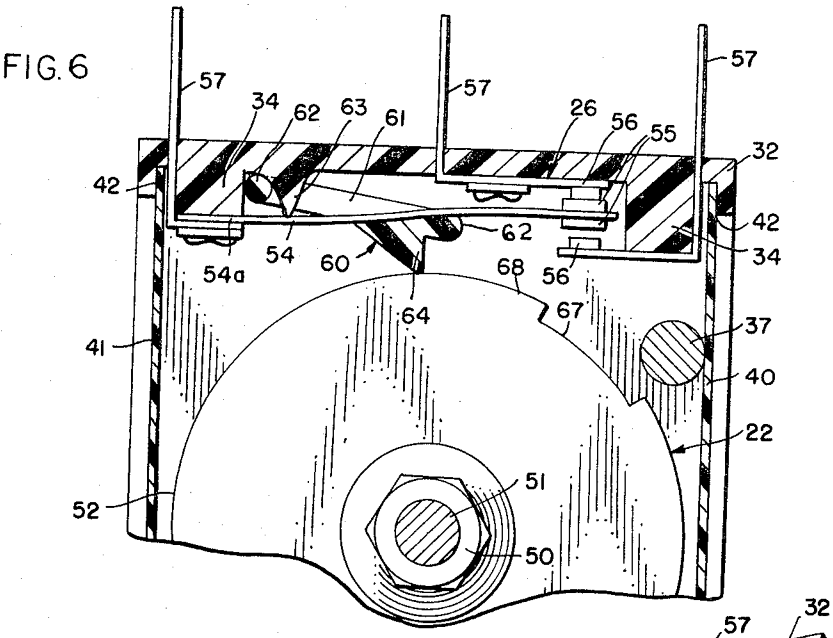
FIGURE 6 is a partial elevational, sectional view of the timing device of FIGURE 1 illustrating a cam follower and typical control switch assembly.
Figures 7, 8:
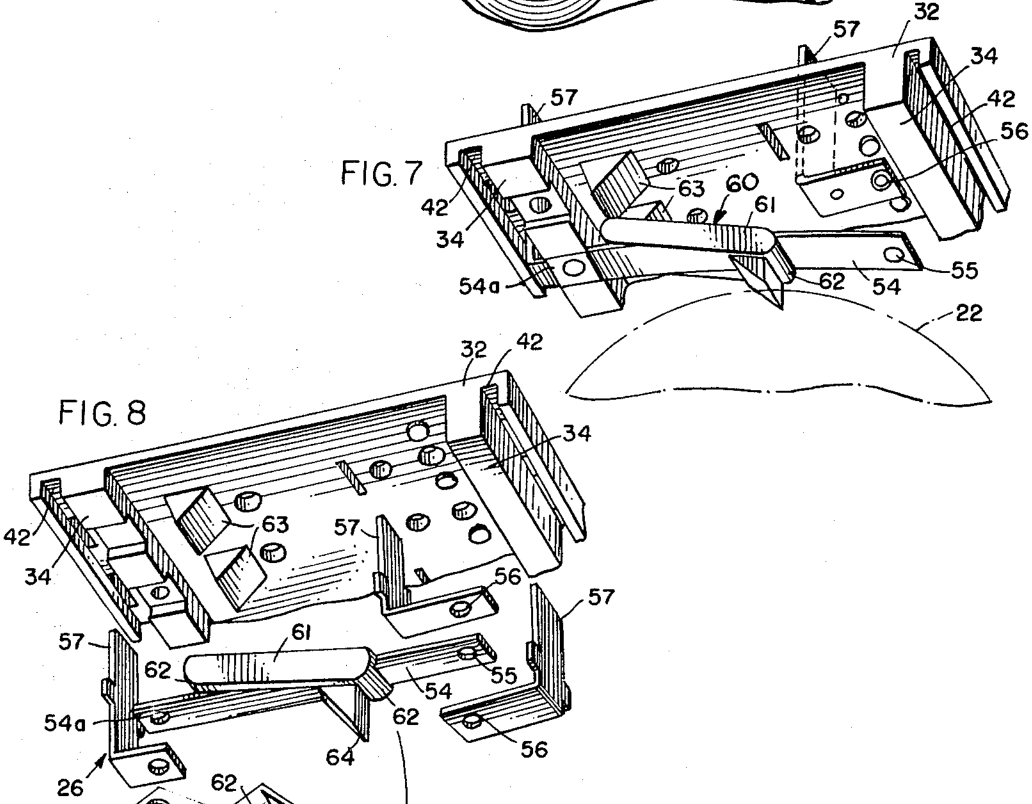
FIGURE 7 is a partial bottom isometric view of the cam follower and control switch mechanism of FIGURE 6.
FIGURE 8 is an exploded bottom isometric view of the cam follower and control switch assembly of FIGURE 7.
Figure 9:
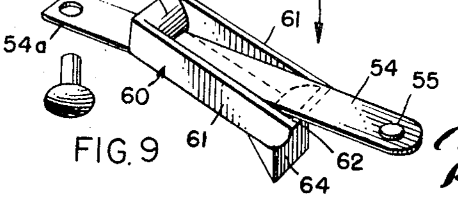
FIGURE 9 is a top isometric view of the cam follower and switch blade of FIGURE 8.
Figure 10:
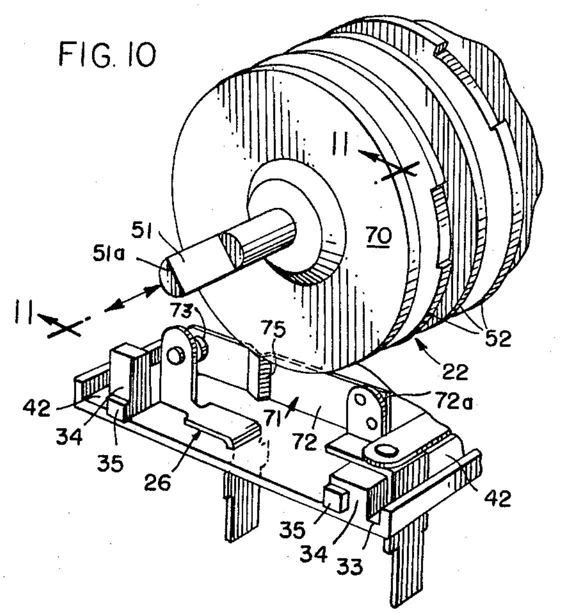
FIGURE 10 is a partial front isometric view of the timing device illustrating the line switch responsive to the push-pull of the control knob.

The cams 52 are effective to control the timed sequence of operations during an operating cycle of the timing device 20, and more specifically to control one or more of the switch members 26 to control the sequence and timing of the operating cycle. As best illustrated in FIGURES 6, 7, 8 and 9, each of the control switch members 26 comprises a switch leaf 54 fixed at one end 54*a* to one of the ribs 34 in one of the terminal boards 32, 33. Each switch leaf 54 carries one or more movable contacts 55 at its other end operatively associated with suitable fixed contacts 56 so as selectively to provide a normally closed or a normally open switch, or to provide a double throw switch. Suitable terminals 57 extend through the respective terminal boards 32, 33 to the exterior thereof for connection to external electrical conductors, and electrically connect with the switch leaf 54 or the fixed contacts 56. It will be appreciated that the switch illustrated in FIGURES 6, 7, 8 and 9 is of the double throw type, while the switch illustrated in FIGURE 5 is of the single contact type. The switch leaf 54 is adapted to open or close with the respective fixed contacts 56 in response to advance of the cams 52. The switch leaves 54 may be made of any suitable conducting material such as copper alloy and may be essentially a nearly flat copper stamping with no sharp bend which might encourage hidden fractures.

In order to control the movement of the switch leaves 54, each of the switch leaves 54 is provided with a suitable cam follower 60. The cam followers 60 may be made of any suitable material, and, in a specific commercial embodiment, were molded of Delrin. The cam followers according to an important feature of the present invention are designed to shift laterally at the instant the follower drops to a lower cam level of the disc cams 52. This feature minimizes forced advance of the cam shaft with its associated wear and tear on the drive system and the motor. The lateral shift is accomplished by forming the cam followers each as a rectangular frame having interconnected side bars 61 and end bars 62. The switch leaf 54 passes through the frame with one of the end bars 62 positioned intermediate the length of the leaf and the other of the end bars being positioned on the other side of the leaf near the fixed end 54*a* thereof. The terminal boards 32 and 33 are provided with suitable stops 63 to limit the sliding movement of the cam follower 60. A projection 64 is provided on one of the end bars 62 and forms a cam rider for engaging and riding on the peripheral surface of one of its associated disc cams 52. It will be understood that the cams 52 are formed with suitable indents 67 or projections 68, FIGURES 5 and 6, forming a track receiving the projection 64.

As heretofore described, the control or switch members 26 control the time functions of the appliance or other device controlled with the timing device 20. It is frequently desirable to provide a main on-off or line switch to control the operation of the timing device. To this end there is provided an end plate cam 70, FIGURES 10, 11 and 12, secured to one end of the inner shaft. The plate cam 70 is adapted to control a suitable control member or line switch 71 in response to axial movement, or push and pull of the control knob on the inner shaft 51. More specifically the plate cam 70 is a disc shaped cam adapted to engage the line switch 71 with its side surface. The line switch 71 includes a suitable switch leaf 72 fixed at one end 72*a* to one of the terminal boards, here shown as terminal board 33. The switch leaf 72 carries a movable contact 73 at its free end. The movable contact is positioned to cooperate with a fixed contact 74 mounted on the terminal board 33. In the illustrated embodiment, the switch leaf 72 is provided with a bent projection 75 forming a cam follower. When the plate cam 70 is in one of its axial positions, it will ride free of the cam follower 75, but when the plate cam 70 is shifted to the other of its positions, as is illustrated in FIGURE 12, it will engage the cam follower 75 to actuate the line switch 71. It will be understood that the line switch 71 may be either normally open or normally closed. The switch may be readily assembled as a normally closed or a normally open switch with essentially identical parts by the mere reversal thereof and rearrangement on the terminal boards.

Figure 13:
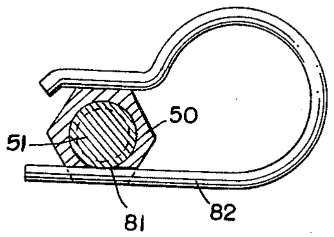
FIGURE 13 is a cross sectional view illustrating in detail the detent means for snapping the inner shaft in its in or out position.
Figure 11:
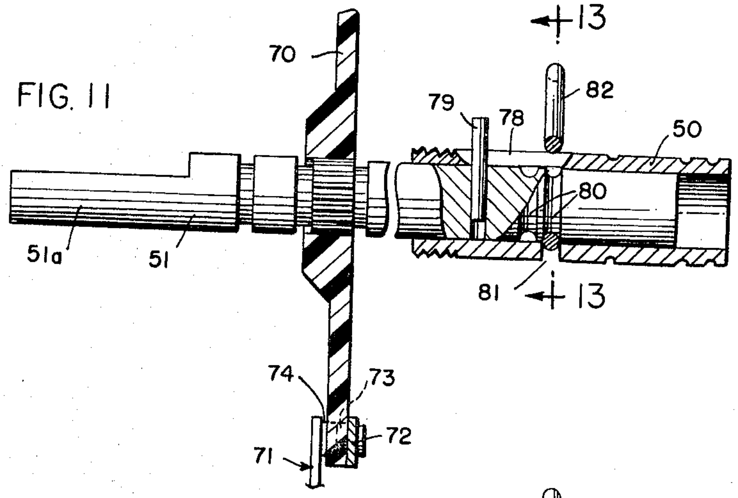
FIGURE 11 is a fragmentary side cross sectional view illustrating the line switch and push-pull cam shaft means of FIGURE 10.
Figure 12:
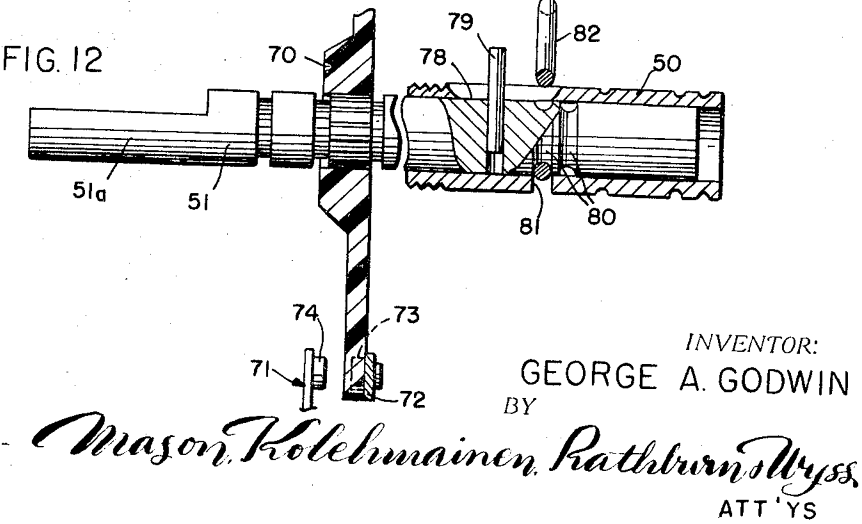
FIGURE 12 is a fragmentary cross sectional view of the line switch and cam shaft means illustrating the inner shaft of the cam shaft means in another of its operating positions.

Suitable means are provided for permitting axial movement of the inner shaft 51 with the outer sleeve 50 while prohibiting relative rotational movement thereof as best illustrated in FIGURES 11, 12 and 13. More specifically the outer sleeve 50 is provided with a longitudinal slot 78 extending through a portion of its periphery and a guide pin 79 extends radially from the inner shaft extending through the longitudinal slot 78 to provide for limited axial movement of the inner shaft 51 relative to the outer sleeve 50 while preventing relative rotational movement of the shaft and sleeve. Moreover to provide detent means for indexing the inner shaft 51 in its desired axial position, the inner shaft is provided with a pair of annular grooves 80 and the outer sleeve 50 is provided with a radial slot 81 aligned with the grooves 80 when the inner shaft 51 is in its in and out positions. A U-shaped biasing spring 82 has one leg thereof extending through the radial slot 81 for engagement within a respective one of the annular grooves 80 to align the inner shaft 51 in its in or out positions.

To permit manual advance of the timing device 20 while overriding the constant speed drive of the drive motor 28, there is provided a suitable gear train and ratchet means 88 best illustrated in FIGURES 4 and 5. More specifically the drive motor 28, mounted on one side of the end plate 30, is provided with a motor pinion 89 extending through the end plate 30 into the interior of the housing 24. The motor pinion 89 engages with a drive gear 90 integrally formed with a driven gear 91. The gear 91 in turn meshes with an additional gear 92 mounted on a pivot plate 93 pivotally mounted about an axis 94 coinciding with the axis of rotation of the gears 90 and 91. Accordingly, gear 92 will always be in engagement with gear 91. Rotating with gear 92 is an additional pinion 95, which may be formed integrally with gear 92 if desired, and which is adapted to drivingly engage a driven gear 96 drivingly connected to the sleeve 50 of the cam and cam shaft assembly 22. The pivot plate 93 is urged by a tension spring 97 to bias the pinion 95 into driving engagement with the driven gear 96.

In operation the gear train and ratchet means 88 is effective to transmit the rotational torque of the motor pinion 89 to the driven gear 96 to provide a constant speed drive to the cam and cam shaft assembly 22. However when it is desired to manually advance the cam and cam shaft assembly 22 by the control knob attached thereto, rotation of the control knob in a forward direction, as indicated by the arrow 98, FIGURE 5, is effective to pivot the pivot plate 93 away from the driven gear 96 to disengage the pinion 95 and thereby permit overriding of the gear train by the manual advance. Rotation of the cam and cam shaft assembly 22 in a reverse direction is prevented by the ratchet arrangement since rotational torque of the driven gear 96 in a reverse direction is effective to pivot the pivot plate in a direction to engage the pinion 95 with the driven gear 96 and prevent reverse rotation of the cam and cam shaft assembly 22.

Figure 14:
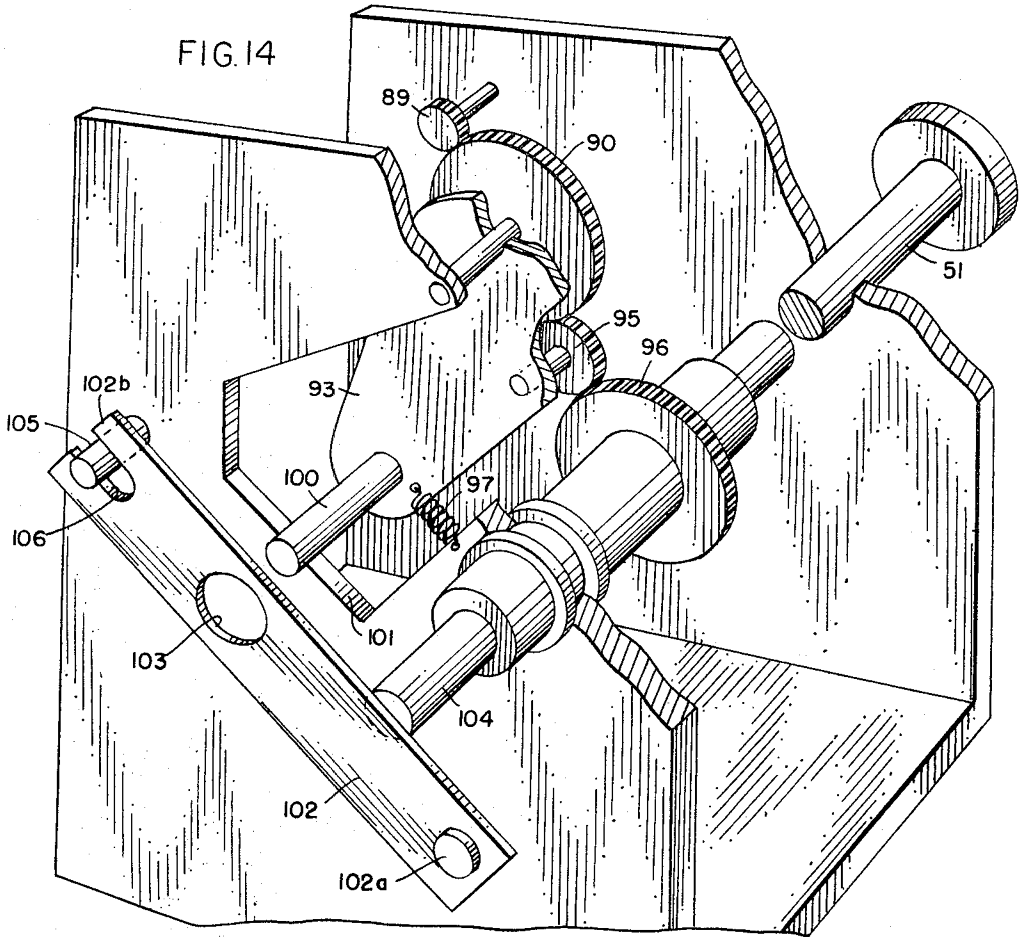
FIGURE 14 is a schematic pictorial diagram of a modification of the embodiment of FIGURES 1 through 13 and including a lockout mechanism preventing manual advance of the cam shaft during energized cycling of the timer.
Figure 15:
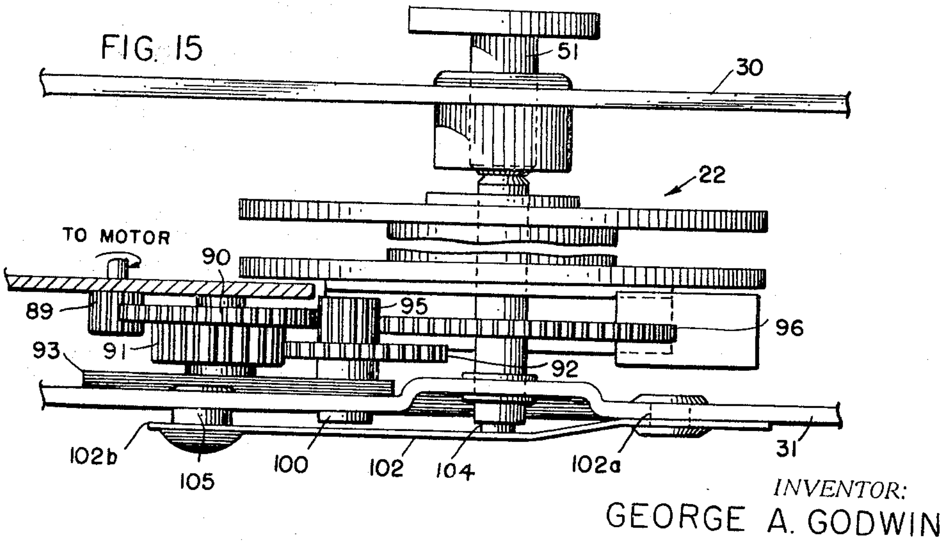
FIGURE 15 is a cross sectional view of the lockout mechanism of FIGURE 14.

Advantageously the prevention of reverse manual rotation of the cam and cam shaft assembly prevents possible damage to the cams, cam followers and control elements. Additionally in certain instances it may be desirable to prevent manual advance of the control shaft in either direction whenever the line switch or control elements actuated by the push-pull of the control knob is on. Such a lockout may readily be provided to the timing device heretofore described. A preferred lockout mechanism is illustrated in FIGURES 14 and 15 wherein the control knob may be manually advanced only when it is in the pulled out position. As therein illustrated, there is provided a locking pin 100 secured to the pivoting end of the pivot plate 93 and extending through an arcuate slot 101 in the end plate 30 to extend beyond the outer end of the housing 24. On the outside of the end plate 30 is positioned a locking spring 102 fixed at one end **102*a* to the end plate 30 and provided with an aperture 103 adapted to receive the locking pin 101 thereby preventing pivoting movement of the pivot plate 93 and consequent ratcheting of the drive mechanism. The locking spring 102 is positioned across the end of the cam and cam shaft assembly 22 in line to be actuated by an extension 104 of the inner shaft 51. The extension 104 is effective to push the locking spring 102 clear of interference with the locking pin 100 when the inner shaft 51 is in its pushed in position thereby releasing the pivot plate for pivoting movement. If desired the free end 102*b* of the locking spring 102 may be provided with suitable guide means such as the provision of a pin 105 received within a slot 106 in the free end 102*b* of the locking spring. It will be understood that when the control knob is in its out position, the locking spring engages the locking pin 100 preventing pivoting of the pivot plate. Therefore the control knob cannot be turned when the control knob is in the out position. However when the control knob is in its in position, the extension 104 is effective to move the locking spring out of engagement with the locking pin 100** and to permit consequent forward advancement of the control knob.

Figure 16:
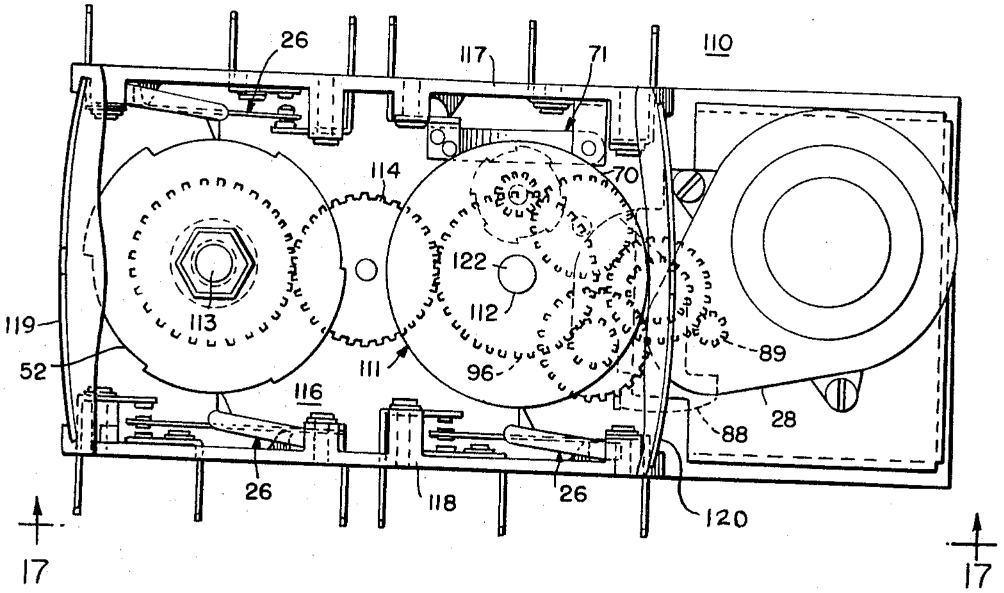
FIGURE 16 is a broken away front view of a tandem shaft arrangement of a timing device according to another embodiment of the present invention.
Figure 17:
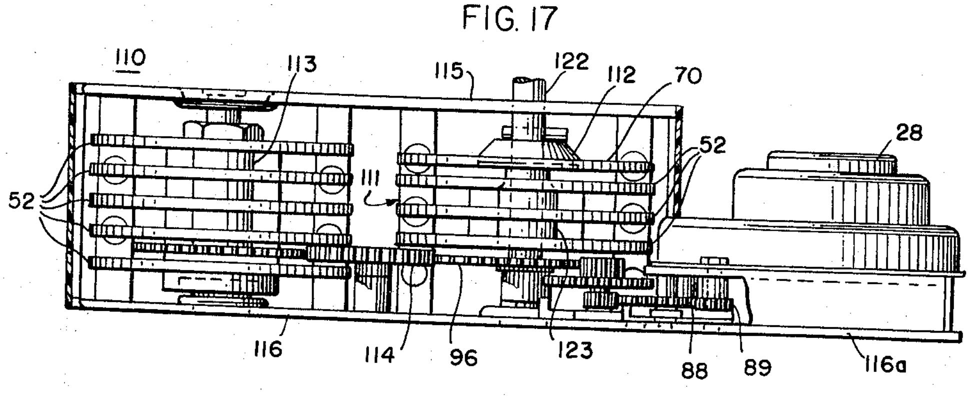
FIGURE 17 is a cross sectional top view of the timing device of FIGURE 16.

The single cam shaft type of timing device described above is suitable for applications where sufficient depth below the mounting surface is available to permit its installation. Where side to side space is limited, as in some dishwasher designs, for example, it is preferable to use a quite narrow timing device such as may be obtained by a tandem cam shaft apparatus. A tandem cam shaft timing device is particularly useful where installation space below the mounting surface is limited, and for applications which demand the use of many timed circuits. One such tandem type timing device according to the present invention is illustrated in the embodiment of FIGURES 16 and 17. As therein illustrated identical parts of the embodiment of FIGURES 16 and 17, and of the embodiment of FIGURES 1 through 13, are described by the same reference characters.

Referring now to the embodiment of FIGURES 16 and 17, there is illustrated an improved tandem timing device 110 according to the present invention. The timing device 110 includes cam and cam shaft assembly 111 comprising a pair of tandem, parallel cam shafts 112, 113 interconnected by suitable idler gear means 114. The cam shafts 112, 113 are each rotatably mounted between metal end plates 115 and 116 of the timer housing. Terminal boards 117 and 118 forming a pair of side plates interconnect the end plates 115 and 116. Additional, flexible bowed side plates 119, 120 complete the housing. The housing of the timing device is similar in construction and function as heretofore described in connection with the embodiment of FIGURES 1 through 13.

Referring now to the cam shafts 112 and 113, at least one of the cam shafts, here shown as camshaft 113, may include an inner shaft 122 and an outer sleeve 123. The inner shaft 122 and the outer sleeve 123 are axially movable through a limited distance, and are rotatable as a unit in like manner as the cam and cam shaft assembly 22 heretofore described in connection with the embodiment of FIGURES 1 through 13. A plurality of disc cams 124 are mounted on the cam shafts 112 and 113. The disc cams 52 each control one or more control switch members 26 to provide the desired electrical timed control.

In addition to the disc cams 52, the inner shaft 122 has fixedly mounted thereto the plate cam 70 controlling the line switch 71 in like manner as heretofore described in connection with the embodiment of FIGURES 1 through 13.

To drive the cam and cam shaft assemblies 111, the timing device 110 is provided with the usual timer motor 28. As heretofore described the timer motor drives a motor pinion 89 which drives the drive gear 96 secured to the outer sleeve 123 through a gear train and ratchet assembly 88. As indicated in FIGURES 16 and 17, the drive motor 28 may be mounted alongside the cam shafts 112 and 113 on an extension **116*a*** of the timer housing thereby providing a timing device of minimum depth.

Figure 18:
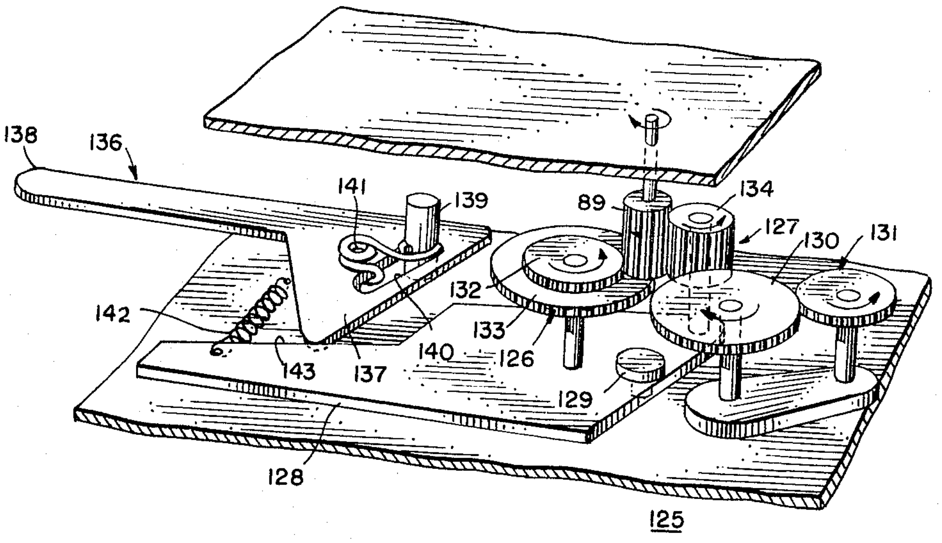
FIGURE 18 is a fragmentary isometric view of a two speed manual lever operated drive for a timer device according to the present invention.
Figure 19:
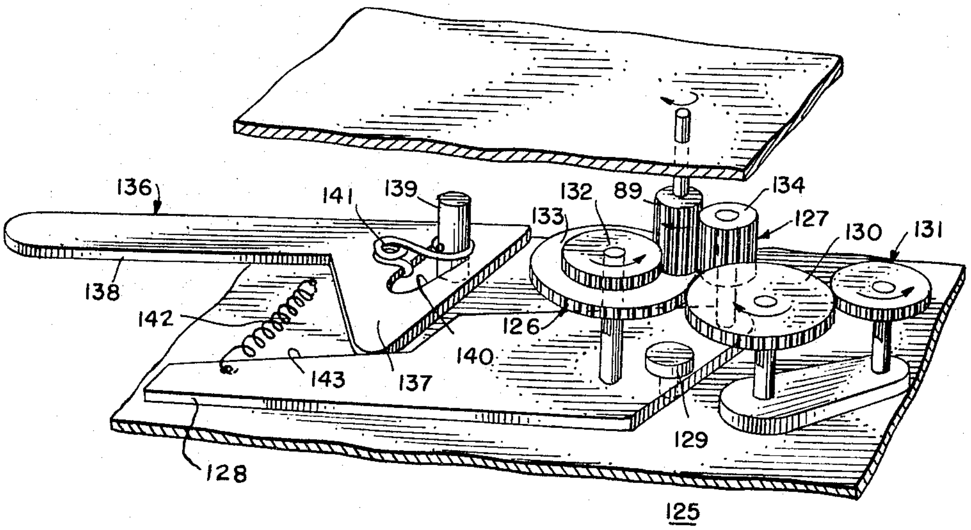
FIGURE 19 is a fragmentary isometric view of the two speed manual lever operated mechanism of FIGURE 18 illustrated in another of its operative positions.

It is sometimes desirable to provide a timing device of the type heretofore described with a selectable speed so that the timing device may operate through a slow or a fast cycle. One such modification provided with a manual lever to permit the customer to select one of two speeds by shifting the control lever is illustrated in FIGURES 18 and 19. The two speed drive therein illustrated may readily be incorporated into the embodiment of FIGURES 1 through 13.

Referring now to the two speed drive arrangement illustrated in FIGURES 18 and 19, there is illustrated a shiftable gear drive 125 which may readily be used on any of the embodiments of the present invention, and, for example, may be incorporated into the embodiment of FIGURES 1 through 13. Accordingly the drive of FIGURES 18 and 19 is described as applied to the embodiment of FIGURES 1 through 13 and identical parts of FIGURES 18 and 19 with part of FIGURES 1 through 13 are identified by the same reference numerals. As therein illustrated, the timing device 20 is driven from the motor pinion 89 and includes a pair of gear train systems 126 and 127 mounted on a pivot plate 128 pivotally mounted about a fixed pin 129 to rotate about an axis coincident with the axis of pinion 89. The gear train systems 126 and 127 are adapted selectively to drive a driven gear 130 in a gear train 131 of the timer drive. In the illustrated embodiment the gear train system 126 is illustrated as formed of two integrally formed gears 132 and 133, one of which, 132, is always in engagement with the motor pinion 89; while the other gear 133 is adapted selectively to be moved into engagement with the driven gear 130. The gear system 127 includes, in the illustrated embodiment, a single gear 134 which is also always in engagement with gear 89 and adapted selectively to be brought into engagement with the driven gear 130. It will be appreciated that since the gear 134 is, in effect, an idler gear, while the gear 133 is larger than the gear 132 on the gear train system 126, that the driving speed of the driven gear 130 will be faster when driven through the system 126 than through the system 127. Moreover pivoting of the pivot plate 128 between the position illustrated in FIGURE 18 and the position illustrated in FIGURE 19 about the pivot pin 129 is effective selectively to engage one of the gear systems 126 or 127 with the driven gear 130.

For controlling the gear selection as between the gear train systems 126 and 127, there is provided a pivotally mounted control member 136 including a cam 137 and a control lever 138. For pivoting the control member 136, a fixed pivot member 139 extends through a transverse slot 140 in the control member 136. A tension spring 142 acts on the pivot plate 128 to bias the pivot plate 128 into the position illustrated in FIGURE 18 wherein the gear train system 127 is effective to drive the timer. A second spring 141 is interposed between the pivot member 139 and the control member 136 to bias the cam 137 into engagement with a cam surface 143 on the pivot plate 128. The force of the spring 141, of course, must be sufficient to override the return bias of the tension spring 142.

From the above detailed description the operation of the shiftable gear drive 125 is believed clear. However, briefly, it will be understood that the two gear trains 126 and 127 are both rotatably mounted on the pivot plate 128 so that each of the train systems is continuously in engagement with the pinion 89, while only one of the train systems selectively is in engagement with the driven gear 130 that is effective to transmit the driving load to the timer shaft. Moreover when the control member 136 is in the position illustrated in FIGURE 18, the spring 142 pivots the pivot plate 128 so as to bring the gear 134 to mesh with the driven gear 130. If the gear teeth of gears 134 and 130 are in interference, spring 142 will stretch until gear 134 advances sufficiently to mesh with the teeth of gear 130. At that time the spring 142 will effect the engagement between the gear teeth of the gears 134 and 130. When the control member 136 is moved to the position illustrated in FIGURE 19, gear 133 is forced into engagement with the driven gear 130. If the gear teeth of the gears 133 and 130 interfere, spring 141 will compress until gear 133 advances sufficiently to allow the gear teeth of the gears 130 and 133 to fully engage. Moreover it will be seen that since the gear 134 is in effect an idler gear, the speed drive through gear 134 is 1:1; on the other hand the speed drive through the gear train system 126 is greater than 1:1 since the gear 133 is larger than the gear 132. Consequently when the gear train system 126 is effective, as illustrated in FIGURE 19, the driven gear 130 rotates at a higher speed than when the driven gear 130 is driven by the gear train system 127. Consequently a selectable one of the two available speeds is provided in the timer.

It is sometimes desirable to provide a fast advance arrangement in a timer so that the cam and cam shaft may be rapidly advanced if it is desired to eliminate all or a portion of a normal timer switch function. Such a feature is readily incorporated into any of the timers heretofore described, for example, the timer illustrated in the embodiment of FIGURES 1 through 13, by the incorporation of an additional motor and gear train system. One of the motors will drive the timer at the speed required by the customer for normal operation of the appliance. The second motor will be geared to drive the timer at a much more rapid rate, thus permitting the output shaft to be rapidly advanced at such time as desired. The fast advance motor may be controlled by one or more cams in the timer switch and may be controlled additionally by a switch located remote from the timer itself.

Figure 20:
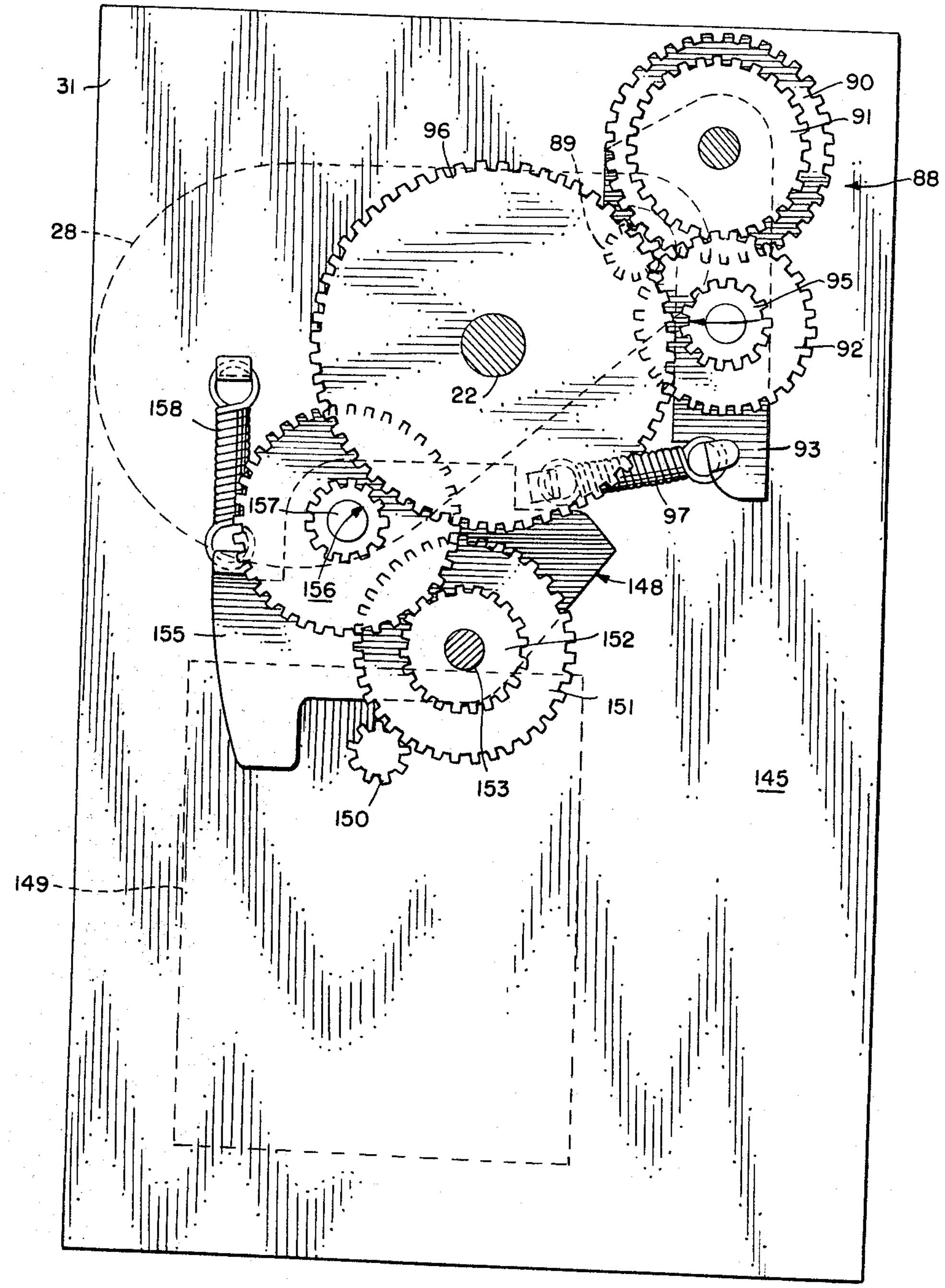
FIGURE 20 is a cross sectional elevational view of a timing device according to yet another embodiment of the present invention and employing two motor drives to provide a rapid advance for the timer between cycles.

Referring now to the embodiment of FIGURE 20, there is illustrated a timer motor and drive assembly 145 suitable for driving any of the heretofore described timers. Identical parts of the embodiment of FIGURE 20 with the embodiment of FIGURES 1 through 13 are identified by the same reference numerals. As heretofore described the timer and drive assembly 145 includes the drive motor 28 secured to one end plate 31 and having the motor pinion 89 extending through the end plate 31. The motor pinion 89 functions through the gear train and ratchet assembly generally shown at 88 to drive the driven gear 96 on the cam and cam shaft assembly 22. As heretofore described the gear train and ratchet means includes a first integrally formed gear including the gear 90 in engagement with the motor pinion 89, and the integrally formed gear 91. Additionally the gear 92 in engagement with the gear 91 is rotatably mounted on the pivot plate 93 pivotally secured to the end plate 31 about the axis of the gear assembly 90 and 91. Formed integrally with the gear 92 is the gear pinion 95 in engagement with the driven gear 96. The spring 97 biases the gear train and ratchet assembly 88 so that the gear 95 is in engagement with the driven gear 96 while permitting the gear 95 to ratchet out of engagement when the cam and cam shaft assembly 22 is manually advanced in a forward direction.

In order to provide a fast advance to the timer during inactive periods there is provided an additional gear train and ratchet means 148 similar in operation to the gear train and ratchet means 88 and driven by a fast drive motor 149 through a motor pinion 150. The motor pinion 150 drives a first gear assembly having a first gear 151 operatively engaging the pinion 150 and having an integrally formed second gear 152 rotatable therewith. The gears 151 and 152 are rotatably mounted to the end plate 31 about a pivot 153. A pivot plate 155 is pivotally secured to the end plate 31 about the pivot 153 and carries a second gear assembly having one gear 156 continuously in engagement with the gear 152, and having formed integrally therewith a pinion 157 operatively in engagement with the driven gear 96. A spring 158 biases the pivot plate in a direction to bring the pinion 157 into engagement with the gear 96. In the manner heretofore described with reference to the gear train and ratchet means 88, forward advance of the gear 96 at a faster rate than the travel of the pinion 157 is effective to pivot the pivot plate 155 outwardly to disengage the pinion 157 from the gear 96 and permit the gear 96 to overtravel the pinion.

It will be understood that while the respective motors 28 and 149 have been described as normal (or slow) and fast respectively; that is the motor and associated gear train assembly which, as a combination, constitutes a slow or fast drive according to the present invention. In one embodiment of the invention the drive motor 149 turned faster than the drive motor 28 so that advance of the shaft 96 under control of the motor 149 was considerably more rapid than advance of the drive gear 96 under the control of the drive motor 28. It was found that with drive motor 149 energized, and drive motor 28 not energized, the cam and cam shaft assembly 20 will advance at a fast speed. Likewise with the drive motor 149 energized and the drive motor 28 energized the cam and cam shaft assembly 22 again will advance at a fast speed. However with the drive motor 149 deenergized, and the normal drive motor 28 energized, the cam and cam shaft assembly will advance at a slow rate of speed. Of course with neither motors 149 nor 28 energized, the cam and cam shaft assembly will not rotate. Manual advance of the cam and cam shaft assembly 22 will be effective to override both the drive of motor 28 and the drive of motor 149 by ratcheting the respective pivot plates 93 and 155 outwardly. Also fast advance of the cam and cam shaft assembly 22 by the fast motor 149 will always override the gear train and ratchet assembly 88 by pivoting the pivot plate 93 outwardly to render the drive from motor 28 ineffective.

Although the present invention has been described by reference to several embodiments thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A timing device comprising a housing formed of a pair of spaced rigid terminal boards of insulating material interconnected by rigid metal end plates, groove means provided along the edges of said terminal boards in the confronting surfaces thereof to provide two pairs of opposed grooves, and a pair of thin flexible side plates, each having opposed edges supported in a respective pair of said opposed grooves, said flexible side plates being supported in compression between said rigid terminal boards to provide an outward bow in said flexible side plates; cam shaft means rotatably supported between said end plates and including an outer sleeve and an inner shaft axially movable within said outer sleeve and having one end thereof extending through one of said end plates for receiving a control knob, said outer sleeve being provided with a longitudinal slot extending through a peripheral portion thereof, a guide pin secured to said inner shaft and extending through said slot to provide relative axial movement of said sleeve and said shaft between in and out axial positions while preventing relative rotation thereof, said outer shaft being provided with a radial slot, said inner shaft being provided with at least a portion of an annular groove aligned with said radial slot when said shaft is in one of said positions, and a generally U-shaped biasing spring over said sleeve having one leg thereof positioned in said radial slot; a plurality of spaced disc cams carried by said sleeve; an end plate cam carried by said shaft; a plurality of control members each comprising a switch leaf fixed at one end to one of said terminal boards and carrying at least one movable contact at its other end, fixed contact means connected to said terminal boards carrying a fixed contact for engagement with said movable contact, and a cam follower attached to each of said switch leaves for pivotal and sliding movement relative thereto and comprising a rectangular frame having interconnected side bars and end bars, said switch leaf passing through said frame with one of said end bars positioned intermediate said leaf and the other of said end bars being positioned on the other side of said leaf near the fixed end thereof, stop means limiting the sliding movement of said follower, and a projection on said one of said end bars forming a cam follower engaging one of said cams; an additional control member operated by axial movement of said inner shaft relative to said sleeve and including a switch leaf fixed at one end and carrying a movable contact at the other end, said switch leaf being actuated by said end plate in response to axial movement of said inner shaft, and fixed contact means for engagement with said movable contact; an electrical drive motor having a motor pinion; a driven gear mounted to drive said sleeve and defining a ratchet gear; a gear train interconnecting said pinion and said driven gear and including at least one gear rotatably mounted about a fixed axis on the other one of said end plates, a pivot plate pivotably mounted about said fixed axis and carrying a pawl gear rotatably mounted on said plate to provide an arcuately movable axis therefor, said pawl gear being in engagement with said one gear, and spring means biasing said plate and said pawl gear into engagement with said driven gear so that rotation of said driven gear in a first direction is effective to pivot said pawl gear away from said driven gear to permit manual rotation of said driven gear in said first direction, and rotation of said driven gear in a second direction is prevented by pivoting of said plate toward said driven gear; and lock means for preventing pivoting of said plate when said inner shaft is in one of its said axial positions, said lock means including a locking spring mounted at one end on the other side of said other end plate, and a locking pin secured to said pivot plate extending through a slot in said end plate adapted to be received in an aperture in said locking spring, said inner shaft engaging said locking spring in one of its said axial positions to move said locking spring out of engaging position with said locking pin.

2. A timing device comprising a housing formed of a pair of spaced rigid terminal boards of insulating material interconnected by rigid metal end plates, groove means provided along the edges of said terminal boards in the confronting surfaces thereof to provide two pairs of opposed grooves, and a pair of thin flexible side plates, each having opposed edges supported in a respective pair of said opposed grooves, said flexible side plates being supported in compression between said rigid terminal boards to provide an outward bow in said flexible side plates; cam shaft means rotatably supported between said end plates and including an outer sleeve and an inner shaft axially movable within said outer sleeve and having one end thereof extending through one of said end plates for receiving a control knob, said outer sleeve being provided with a longitudinal slot extending through a peripheral portion thereof, a guide pin secured to said inner shaft and extending through said slot to provide relative axial movement of said sleeve and said shaft between in and out axial positions while preventing relative rotation thereof, said outer shaft being provided with a radial slot, said inner shaft being provided with at least a portion of an annular groove aligned with said radial slot when said shaft is in one of said positions, and a generally U-shaped biasing spring over said sleeve having one leg thereof positioned in said radial slot; a plurality of spaced disc cams carried by said sleeve; an end plate cam carried by said shaft; a plurality of control members, each comprising a switch leaf fixed at one end to one of said terminal boards and carrying at least one movable contact at its other end, fixed contact means connected to said terminal boards carrying a fixed contact for engagement with said movable contact, and a cam follower attached to each of said switch leaves for pivotal and sliding movement relative thereto and comprising a rectangular frame having interconnected side bars and end bars, said switch leaf passing through said frame with one of said end bars positioned intermediate said leaf and the other of said end bars being positioned on the other side of said leaf near the fixed end thereof, stop means limiting the sliding movement of said follower, and a projection on said one of said end bars forming a cam follower for engaging one of said cams; an additional control member operated by axial movement of said inner shaft relative to said sleeve and including a switch leaf fixed at one end and carrying a movable contact at the other end, said switch leaf being actuated by said end plate in response to axial movement of said inner shaft, and fixed contact means for engagement with said movable contact; an electrical drive motor having a motor pinion; a driven gear mounted to drive said sleeve and defining a ratchet gear; and a gear train interconnecting said pinion and said driven gear and including at least one gear rotatably mounted about a fixed axis on the other one of said end plates, a pivot plate pivotably mounted about said fixed axis and carrying a pawl gear rotatably mounted on said plate to provide an arcuately movable axis therefor, said pawl gear being in engagement with said one gear, and spring means biasing said plate and said pawl gear into engagement with said driven gear so that rotation of said driven gear in a first direction is effective to pivot said pawl gear away from said driven gear to permit manual rotation of said driven gear in said first direction, and rotation of said driven gear in a second direction is prevented by pivoting of said plate toward said driven gear.

3. A timing device comprising a housing formed of a pair of spaced terminal boards of insulating material interconnected by rigid metal end plates, groove means provided along the edges of said terminal boards in the confronting surfaces thereof to provide two pairs of opposed grooves, and a pair of thin flexible side plates, each having opposed edges supported in a respective pair of said opposed grooves, said flexible side plates being supported in compression between said terminal boards to provide an outward bow in said flexible side plates; cam shaft means rotatably supported between said end plates and including an outer sleeve and an inner shaft axially movable within said outer sleeve and having one end thereof extending through one of said end plates for receiving a control knob, said outer sleeve being provided with a longitudinal slot extending through a peripheral portion thereof, a guide pin secured to said inner shaft and extending through said slot to provide relative axial movement of said sleeve and said shaft between in and out axial positions while preventing relative rotation thereof, said outer shaft being provided with a radial slot, said inner shaft being provided with at least a portion of an annular groove aligned with said radial slot when said shaft is in one of said positions, and a generally U-shaped biasing spring over said sleeve having one leg thereof positioned in said radial slot; a plurality of spaced disc cams carried by said sleeve; an end plate cam carried by said shaft; a plurality of control members, each comprising a switch leaf fixed at one end to one of said terminal boards and carrying at least one movable contact at its other end, fixed contact means connected to said terminal boards carrying a fixed contact for engagement with said movable contact, and a cam follower attached to each of said switch leaves for pivotal and sliding movement relative thereto and comprising a rectangular frame having interconnected side bars and end bars, said leaf spring passing through said frame with one of said end bars positioned intermediate said leaf and the other of said end bars being positioned on the other side of said leaf near the fixed end thereof, stop means limiting the sliding movement of said follower, and a projection on said one of said end bars forming a cam follower for engaging one of said cams; an additional control member operated by axial movement of said inner shaft relative to said sleeve and including a switch leaf fixed at one end and carrying a movable contact at the other end, said switch leaf being actuated by said end plate in response to axial movement of said inner shaft, and fixed contact means on said housing cooperating with said movable contact; an electrical drive motor having a motor pinion; a pivot plate pivotably mounted about the axis of said pinion for positioning between a slow and a fast position, a driven gear connected to drive said cam shaft means, a first gear train means having a gear continuously in engagement with said pinion and having gear means engaging said driven gear when said pivot plate is in one of its said positions, second gear train means having a different speed ratio than the first mentioned gear train means and having a gear continuously in engagement with said pinion and having gear means engaging said driven gear when said pivot plate is in the other of said positions, and spring means biasing said pivot plate into one of its said positions, a speed selection lever having a cam surface for moving said pivot plate into the other of its said positions against the return bias of said spring means, said speed selection lever being provided with a transverse slot, pivot means extending through said slot and second spring means biasing said lever toward said pivot plate against said stop with sufficient force to override the bias of the first mentioned spring means.

4. A timing device comprising a housing formed of a pair of spaced terminal boards of insulating material interconnected by rigid metal end plates, groove means provided along the edges of said terminal boards in the confronting surfaces thereof to provide two pairs of opposed grooves, and a pair of thin flexible side plates, each having opposed edges supported in a respective pair of said opposed grooves, said flexible side plates being supported in compression between said terminal boards to provide an outward bow in said flexible side plates; cam shaft means rotatably supported between said end plates and including an outer sleeve and an inner shaft axially movable within said outer sleeve and having one end thereof extending through one of said end plates for receiving a control knob, said outer sleeve being provided with a longitudinal slot extending through a peripheral portion thereof, a guide pin secured to said inner shaft and extending through said slot to provide relative axial movement of said sleeve and said shaft between in and out axial positions while preventing relative rotation thereof, said outer shaft being provided with a radial slot, said inner shaft being provided with at least a portion of an annular groove aligned with said radial slot when said shaft is in one of said positions, and a generally U-shaped biasing spring over said sleeve having one leg thereof positioned in said radial slot; a plurality of spaced disc cams carried by said sleeve; an end plate cam carried by said shaft; a plurality of control members each comprising a switch leaf fixed at one end to one of said terminal boards and carrying at least one movable contact at its other end, fixed contact means connected to said terminal boards carrying a fixed contact for engagement with said movable contact, and a cam follower attached to each of said switch leaves for pivotal and sliding movement relative thereto and comprising a rectangular frame having interconnected side bars and end bars, said switch leaf passing through said frame with one of said end bars positioned intermediate said leaf and the other of said end bars being positioned on the other side of said leaf near the fixed end thereof, stop means limiting the sliding movement of said follower, and a projection on said one of said end bars forming a cam follower for engaging one of said cams; an additional control member operated by axial movement of said inner shaft relative to said sleeve and including a switch leaf fixed at one end and carrying a movable contact at the other end, said switch leaf being actuated by said end plate in response to axial movement of said inner shaft, and fixed contact means for engagement with said movable contact; a first drive motor mounted to said housing having a motor pinion; a driven gear for driving said sleeve and defining a ratchet gear; a first ratchet coupling including a gear train having a first gear in engagement with said pinion, a pivot plate pivotally mounted about the axis of said first gear, pawl gear means mounted on said pivot plate, and spring means biasing said pivot plate to position said pawl gear means in engagement with said driven gear; a second drive motor mounted to said housing having a second motor pinion; a second ratchet coupling including a gear train having a first gear in engagement with said second motor pinion, a pivot plate pivotally mounted about the axis of the last mentioned first gear; pawl gear means mounted on the last mentioned pivot plate and spring means biasing said last mentioned pivot plate to position the last mentioned gear means in engagement with said driven gear.

5. A timing device comprising a housing; cam shaft means rotatably supported within said housing and including an outer sleeve and an inner shaft rotatable as a unit and mounted for limited relative axial movement; a plurality of spaced disc cams carried by said cam shaft means; an end plate cam carried by said shaft; a plurality of control members defining switch means, cam follower means each engaging a track of said cams and connected to said control members to actuate said control members; a control member responsive to axial movement of said end cam; an electrical drive motor having a motor pinion; a driven gear mounted to drive said cam shaft means and defining a ratchet gear; gear train means interconnecting said pinion and said driven gear and including a ratchet coupling for permitting manual rotation of said cam shaft means in one direction only; and lock means engaging said ratchet coupling operated by the axial position of said inner shaft for preventing manual rotation of said cam shaft means in said one direction.

6. A timing device comprising a housing; cam shaft means rotatably supported within said housing; a plurality of spaced disc cams carried by said cam shaft means; a plurality of control members defining switch means operated by said cams; an electrical drive motor having a motor pinion; a driven gear mounted to drive said cam shaft means and defining a ratchet gear; a gear train defining a ratchet coupling interconnecting said pinion and said driven gear and including at least one gear rotatably mounted about a fixed axis, a pivot plate pivotally mounted about said fixed axis and carrying a pawl gear rotatably mounted on said plate to provide an arcuately movable axis for said pawl gear, said pawl gear engaging with said one gear, spring means biasing said plate and said ratchet gear into engagement with said driven gear so that rotation of said driven gear in a first direction is effective to pivot said ratchet gear away from said driven gear to permit manual advance of said driven gear in said first direction, and rotation of said driven gear in a second direction is prevented by pivoting of said plate toward said driven gear, said cam shaft means including an outer sleeve and an inner shaft rotatable as a unit and having limited relative axial movement, and additionally including lock means for preventing pivoting of said plate when said inner shaft is in one of its axial positions, said lock means including a locking spring fixed at one end, and a locking pin secured to the pivot plate receivable in an aperture in said locking spring, said inner shaft engaging with said locking spring when said inner shaft is in one of its axial positions to move said locking spring out of engaging position with said locking pin.

7. An electrical drive assembly for a timer device and the like and comprising an electrical drive motor having a motor pinion; a driven gear defining a ratchet gear; and a gear train defining a ratchet coupling interconnecting said pinion and said driven gear and including at least one gear rotatably mounted about a fixed axis, a pivot plate pivotally mounted about said fixed axis and carrying a pawl gear rotatably mounted on said plate to provide an arcuately movable axis therefor, said pawl gear drivingly engaging said one gear, spring means biasing said plate and said pawl gear into engagement with said driven gear so that rotation of said driven gear in a first direction pivots said pawl gear away from said driven gear to permit manual rotation of said driven gear in said first direction, and rotation of said driven gear in a second direction is prevented by pivoting of said plate toward said driven gear, and lock means for selectively preventing pivoting of said plate and including a locking spring fixed at one end and a locking pin secured to said pivot plate extending through a slot in said end plate receivable in an aperture in said locking spring, and means for moving said locking spring into and out of engaging position with said locking pin.

8. A timing device comprising a housing; cam shaft means rotatably supported within said housing and including an outer sleeve and an inner shaft rotatable as a unit and mounted for limited relative axial movement; a plurality of spaced disc cams carried by said cam shaft means; an end plate cam carried by said inner shaft; a plurality of control members defining switch means; cam follower means each engaging a track of said cams and operating said control members to actuate said control members; a control member responsive to axial movement of said end cam; an electrical drive motor having a motor pinion; a pivot plate pivotally mounted about the axis of said pinion movable between a slow and a fast position, a driven gear connected to drive said cam shaft means, a first gear train means having a gear in engagement with said pinion and having gear means drivingly engaging with said driven gear when said pivot plate is in one of its said positions, second gear train means having a different speed ratio than the first mentioned gear train means and having gear means in engagement with said pinion and having gear means drivingly engaging with said driven gear when said pivot plate is in the other of said positions, spring means biasing said pivot plate into one of its said positions, a speed selection lever having a cam surface effective to move said pivot plate into the other of its said positions against the return bias of said spring means, said speed selection lever being provided with a transverse slot, pivot means forming a stop extending through said slot, and second spring means effective to bias said lever towards said pivot plate against said stop with sufficient force to override the bias of the first mentioned spring means.

9. A selectable multispeed gear train for interconnecting a drive motor having a motor pinion with a driven gear, and comprising a pivot plate pivotally mounted along the axis of the pinion movable between a slow and a fast position, a first gear train means having a gear in engagement with said pinion and having gear means drivingly engaging with said driven gear when said pivot plate is in one of its positions, second gear train means having a different speed ratio than the first mentioned gear train means and having a gear in engagement with said pinion and having gear means drivingly engaging with said driven gear when said pivot plate is in the other of its said positions, spring means biasing said pivot plate into one of its said positions, a speed selection lever having a cam surface effective to move said pivot plate into the other of its said positions against the return bias of said spring means, said speed selection lever being provided with a transverse slot, pivot means forming a stop extending through said slot, and second spring means effective to bias said lever towards said pivot plate against said stop with sufficient force to override the bias of the first mentioned spring means.

10. A timing device comprising a housing; cam shaft means rotatably supported within said housing; a plurality of spaced disc cams carried by said cam shaft means; a plurality of control members defining switch means; cam follower means each engageable in a track of said cam and operating said control members; a driven gear defining a ratchet gear drivingly connected to drive said cam shaft; a first drive motor having a motor pinion; a first gear train defining a first ratchet coupling having a first gear in engagement with said pinion, a pivot plate pivotally mounted about the axis of said first gear, pawl gear means mounted on said pivot plate, and spring means biasing said pivot plate to position said gear pawl means in engagement with said driven gear; a second drive motor having a second motor pinion; a second ratchet gear train defining a second ratchet coupling having a first gear in engagement with said second motor pinion, a pivot plate pivotally mounted about the axis of the last mentioned first gear; pawl gear means mounted on the last mentioned pivot plate and spring means biasing said last mentioned pivot plate to a position with the last mentioned pawl gear means in engagement with said driven gear.

11. A multispeed drive for driving a driven gear of a timing device and the like and including a first drive motor having a motor pinion; a first gear train defining a first ratchet coupling having a first gear in engagement with said pinion, a pivot plate pivotally mounted about the axis of said first gear, pawl gear means mounted on said pivot plate, and spring means biasing said pivot plate to position said pawl gear means in engagement with said driven gear; a second drive motor having a second motor pinion; a second gear train defining a second ratchet coupling having a first gear in engagement with said second motor pinion, a second pivot plate pivotally mounted about the axis of the last mentioned first gear, pawl gear means mounted on the last mentioned pivot plate, and spring means biasing said last mentioned pivot plate to position the last mentioned gear means in engagement with said driven gear.

12. A multispeed drive as set forth in claim 11 above wherein said second drive motor and the last mentioned gear train have a combined speed different from that of said first drive motor and the first mentioned gear train.

13. A multispeed drive as set forth in claim 12 above wherein said drive motors rotate at different speeds.

14. A multispeed drive for driving a driven gear of a timing device and the like and including a first drive motor; a first gear train defining a first ratchet coupling interconnecting said motor and said driven gear permitting said driven gear to override said motor; a second drive motor; and a second gear train defining a second ratchet coupling operatively interconnecting said second motor and said driven gear permitting said driven gear to override said second motor.

(References on following page)

References Cited

UNITED STATES PATENTS

| | | | |
|---|---|---|---|
| 2,549,025 | 4/1951 | Sisson | 74—640 |
| 2,556,095 | 6/1951 | Loewenstein | 200—38 |
| 2,603,725 | 7/1952 | Dietrich | 200—38 |
| 2,870,834 | 1/1959 | Sisson | 200—38 |
| 2,873,333 | 2/1959 | Jackaman | 200—168 |
| 2,976,377 | 3/1961 | Jordon | 200—38 |
| 3,040,227 | 6/1962 | Hauser | 200—38 |
| 3,060,288 | 10/1962 | Gallagher | 200—38 |
| 3,077,784 | 2/1963 | Laviana | 200—38 |

FOREIGN PATENTS

| | | |
|---|---|---|
| 1,308,007 | 9/1961 | France. |

BERNARD A. GILHEANY, *Primary Examiner.*

H. E. SPRINGBORN, G. MAIER, *Assistant Examiners.*